(12) United States Patent
Heikkila

(10) Patent No.: US 10,052,691 B2
(45) Date of Patent: *Aug. 21, 2018

(54) SURFACE MODIFIED PARTICULATE AND SINTERED OR INJECTION MOLDED PRODUCTS

(71) Applicant: Tundra Composites, LLC, White Bear Lake, MN (US)

(72) Inventor: Kurt E. Heikkila, Marine on the St. Croix, MN (US)

(73) Assignee: Tundra Composites, LLC, White Bear Lake, MN (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/152,772

(22) Filed: May 12, 2016

(65) Prior Publication Data

US 2016/0256925 A1 Sep. 8, 2016

Related U.S. Application Data

(63) Continuation of application No. 14/329,274, filed on Jul. 11, 2014, now Pat. No. 9,512,544.

(60) Provisional application No. 61/845,007, filed on Jul. 11, 2013.

(51) Int. Cl.

| | | |
|---|---|---|
| B22F 5/12 | (2006.01) |
| B29C 47/00 | (2006.01) |
| D01F 1/10 | (2006.01) |
| D01F 6/04 | (2006.01) |
| D01F 9/08 | (2006.01) |
| B29C 67/00 | (2017.01) |
| B33Y 10/00 | (2015.01) |
| B33Y 70/00 | (2015.01) |
| B28B 1/00 | (2006.01) |
| D01F 6/46 | (2006.01) |
| B29C 47/02 | (2006.01) |
| B29C 47/86 | (2006.01) |
| B29C 47/92 | (2006.01) |
| H01F 1/28 | (2006.01) |
| B22F 1/00 | (2006.01) |
| B22F 3/105 | (2006.01) |
| C22C 32/00 | (2006.01) |
| B22F 3/00 | (2006.01) |
| B22F 3/10 | (2006.01) |
| B22F 3/16 | (2006.01) |
| B22F 3/20 | (2006.01) |
| B29K 23/00 | (2006.01) |

(52) U.S. Cl.

CPC .............. *B22F 5/12* (2013.01); *B22F 1/004* (2013.01); *B22F 1/0062* (2013.01); *B22F 1/0074* (2013.01); *B22F 3/004* (2013.01); *B22F 3/008* (2013.01); *B22F 3/1021* (2013.01); *B22F 3/1055* (2013.01); *B22F 3/16* (2013.01); *B22F 3/20* (2013.01); *B28B 1/001* (2013.01); *B29C 47/0004* (2013.01); *B29C 47/0014* (2013.01); *B29C 47/026* (2013.01); *B29C 47/86* (2013.01); *B29C 47/92* (2013.01); *B29C 67/0055* (2013.01); *B33Y 10/00* (2014.12); *B33Y 70/00* (2014.12); *C22C 32/0094* (2013.01); *D01F 1/10* (2013.01); *D01F 6/04* (2013.01); *D01F 6/46* (2013.01); *D01F 9/08* (2013.01); *H01F 1/28* (2013.01); *B29C 2947/92704* (2013.01); *B29K 2023/065* (2013.01); *D10B 2321/02* (2013.01); *D10B 2321/021* (2013.01); *Y02P 10/295* (2015.11); *Y10T 428/2927* (2015.01)

(58) Field of Classification Search
CPC ........ B22F 3/004; B22F 3/008; B22F 1/0062; B22F 1/0074; B22F 1/004; B22F 5/12; B33Y 10/00; B33Y 70/00

See application file for complete search history.

(56) References Cited

U.S. PATENT DOCUMENTS

| | | |
|---|---|---|
| 2,723,238 A | 11/1955 | Simpkiss, Jr. |
| 2,723,239 A | 11/1955 | Harvey |
| 2,852,364 A | 9/1958 | Spedding et al. |
| 2,968,649 A | 1/1961 | Pailthorp et al. |
| 3,178,399 A | 4/1965 | Lo |
| 3,365,315 A | 1/1968 | Beck et al. |
| 4,257,699 A | 3/1981 | Lentz |
| 4,322,371 A | 3/1982 | Stahler et al. |
| 4,418,186 A | 11/1983 | Yamabe et al. |
| 4,569,978 A | 2/1986 | Barber |

(Continued)

FOREIGN PATENT DOCUMENTS

| | | |
|---|---|---|
| DE | 4322371 | 2/1994 |
| DE | 102011110804 | 2/2013 |

(Continued)

OTHER PUBLICATIONS

German, M. R. "Powder Metallurgy Science,"1984, p. 148.

(Continued)

*Primary Examiner* — Edward J Cain
(74) *Attorney, Agent, or Firm* — Mark J. DiPietro; Fred C. Morgan

(57) ABSTRACT

Disclosed are interfacially modified particulate and polymer composite material for use in injection molding processes, such as metal injection molding and additive process such as 3D printing. The composite material is uniquely adapted for powder metallurgy processes. Improved products are provided under process conditions through surface modified powders that are produced by extrusion, injection molding, additive processes such as 3D printing, Press and Sinter, or rapid prototyping.

23 Claims, No Drawings

(56) References Cited

U.S. PATENT DOCUMENTS

| | | |
|---|---|---|
| 4,908,340 A | 3/1990 | Frechette et al. |
| 5,017,432 A | 5/1991 | Eddy et al. |
| 5,041,248 A | 8/1991 | Renlund et al. |
| 5,061,965 A | 10/1991 | Ferguson et al. |
| 5,121,329 A | 6/1992 | Crump et al. |
| 5,129,329 A | 7/1992 | Clasen |
| 5,198,489 A | 3/1993 | Sterzel et al. |
| 5,214,106 A | 5/1993 | Carlson et al. |
| 5,639,838 A | 6/1997 | Albano et al. |
| 5,645,781 A | 7/1997 | Popovic et al. |
| 5,696,216 A | 12/1997 | Kruger et al. |
| 5,860,055 A | 1/1999 | Hesse et al. |
| 6,722,872 B1 | 4/2004 | Swanson et al. |
| 7,087,200 B2 | 8/2006 | Taboas et al. |
| 7,153,594 B2 | 12/2006 | Knutsson et al. |
| 7,309,728 B2 | 12/2007 | Kasperchik et al. |
| 7,491,356 B2 | 2/2009 | Heikkila |
| 7,534,386 B2 | 5/2009 | Priedeman et al. |
| 7,550,518 B2 | 6/2009 | Bredt et al. |
| 7,871,556 B2 | 1/2011 | Patel et al. |
| 7,942,987 B2 | 5/2011 | Zinniel et al. |
| 8,185,229 B2 | 5/2012 | Davidson |
| 8,221,669 B2 | 7/2012 | Batchelder et al. |
| 8,282,380 B2 | 10/2012 | Pax et al. |
| 8,313,087 B2 | 11/2012 | Hesse et al. |
| 9,512,544 B2 * | 12/2016 | Heikkila ............. B29C 67/0055 |
| 2004/0191519 A1 | 9/2004 | Kejzelman et al. |
| 2005/0023710 A1 | 2/2005 | Brodkin et al. |
| 2010/0279100 A1 | 11/2010 | Heikkila et al. |
| 2010/0280145 A1 | 11/2010 | Heikkila et al. |
| 2010/0280164 A1 | 11/2010 | Heikkila et al. |
| 2011/0076496 A1 | 3/2011 | Batchelder et al. |
| 2012/0070619 A1 | 3/2012 | Mikulak et al. |
| 2012/0261848 A1 | 10/2012 | Haraszati et al. |

FOREIGN PATENT DOCUMENTS

| | | |
|---|---|---|
| EP | 0287045 | 10/1988 |
| GB | 827308 | 2/1960 |
| JP | 2000064125 | 2/2000 |
| JP | 2000355832 | 12/2000 |
| WO | 2015006697 | 1/2015 |

OTHER PUBLICATIONS

Greulich, Michael et al., "Fast, Functional Prototypes via Multiphase Jet Solidification," Rapid Prototyping Journal, vol. 1, No. 1, 1995, pp. 20-25.

"International Search Report and Written Opinion," For PCT Application No. PCT/US2014/046362 (our file No. 492.0035WOU1), dated Sep. 30, 2014 (19 pages).

* cited by examiner

SURFACE MODIFIED PARTICULATE AND SINTERED OR INJECTION MOLDED PRODUCTS

This application claims the benefit of U.S. Provisional Patent Application Ser. No. 61/845,007, filed Jul. 11, 2013, the contents of which are herein incorporated by reference in its entirety.

FIELD

Embodiments disclosed herein relate to interfacially modified particulate and polymer composite material for use in part or component making processes like injection molding processes, such as metal injection molding and additive manufacturing, such as 3D printing. The composite material is uniquely adapted for powder metallurgy processes. Improved products are provided under process conditions through surface modified powders that are produced by extrusion, injection molding, 3D printing, or rapid prototyping.

BACKGROUND

The use of inorganic or metal powders in injection molding, press and center and in metal injection molding (MIM) processes is a mature technology. Recent developments include the utility of new materials and manufacturing techniques. For example, injection molding and 3D printing uses a variety of inorganic and metallic powders as a raw material from which a variety of product shapes and parts can be made (e.g.) by metal injection molding (MIM) and 3D printing. In particular, precise shapes that perform uses in many commercial and consumer based products have been made. Applications include automotive applications, aerospace applications, consumer durable goods, computer applications, medical applications and others. Inorganic and/or metal powders are consolidated or densified into specific shapes through a number of different production processes.

In general, powder injection molded products are made by obtaining desirable raw materials, such as inorganic, ceramic or elemental or alloy metal powders. These powders can be combined with optional additives, such as resins, waxes, graphite, dyes or lubricants which can be mixed and then formed into an initial shape using hot or cold compaction techniques. Typically, the initially formed shaped material is sintered during the hot compaction stage or after the cold compaction stage to obtain a shaped inorganic or metal object in which the bonds between individual particles form as direct particle to particle bonds. After initial processing, finishing steps including machining, heat treatment, steam treatment, composite formation, plating, etc. can be used in forming a final finished product. Press and Sinter and MIM forming can reduce cost and produce a wide variety of simple and complex finished products in low cost processing techniques.

A substantial need for the improvement of the forming or compaction step has been noted in the industry. The feedstock of the powder material is often difficult to process into the mold or through an orifice useful in 3D printing due to the materials lack of viscoelastic, such as flow characteristics, physical and mechanical properties, and lack of self-ordering and packing of particle fractions. In certain instances, the products made with MIM, Press and Sinter or 3D printing processes do not have the commercially effective physical properties for many applications. Often, the formed objects, green body and/or brown body, have defects such as an absence of strength, density, or other needed properties as a result of insufficient particle packing and subsequent inefficient particle bonding. Further, the energy required to initially conform or eject the particulate mass to a particular shape such that the shape is complete and well-formed is excessive. The machines that initially form or compact the objects do not uniformly or fully fill, the whole space with powder resulting in a malformed part or unit.

Particle and polymer mixtures in which a finely divided powder or particulate is dispersed have been suggested for MIM. Catamold®, a BASF product, is a material for metal and ceramic injection molding based on polyacetal resin combined with stainless steels, special alloys or ceramics. However, Catamold® particulate material is not surface coated and does not have viscoelastic properties or particle packing properties in the resin that are helpful to injection molding and 3D printing processes. U.S. Pat. No. 7,153,594 B2, Kejzelman et. al., discloses organic coatings and lubricants for ferromagnetic chosen from organo-silane, organo-titanate, organo-aluminate or organo-zirconate compounds without a polymer. Without the polymer phase, Kejzelman cannot have viscoelastic properties or particle packing properties.

A substantial need exists to improve powder injection techniques such that the products are improved, the energy to form the part is reduced and the part formed in the process is complete without the malformations.

BRIEF DESCRIPTION

We have found that by forming an inorganic, ceramic or metal particulate comprising a particle with a coating of an interfacial modifier on the particle and combined with a thermoplastic polymer can result in an inorganic polymer composite with high particle packing fractions and viscoelastic properties, such as melt flow, that can be readily formed into a useful product via additive manufacturing and/or sintering.

The embodiment further relates to a particulate material with a coating of an interfacial modifier and thermoplastic polymer that through the selection of particle type, particle size, particle shape, and interfacial modifier can form a composite to provide substantially improved extruded, injection molded, and 3D printed products. The coating of interfacial modifier on the particulate results in reduced shrinkage of the mass of particulate in the part or shaped article during the processes. Reduced shrinkage provides reproducibility of the part or shaped article. Further, the interfacial modifier permits very high packing fractions of the particles as the particles tend to self-order themselves to achieve the highest packing density in a volume of the particles. The resulting molded products can exceed contemporary products at least in tensile strength, impact strength and density.

We have found that by using an interfacially modified coated particulate that the extrusion, injection molding, and 3D printing processes can be improved by providing viscoelastic properties, such as increasing flow rates and reducing process pressures, during the extrusion, injection molding or 3D printing processes. Further, we have found that the green body and final products of the extrusion, 3D printing processes and injection molding processes can be improved through the increased packing density of the particulate in the green and final products. The packing density, or packing fraction, is a useful predictor of the properties of the resulting products. The improved packing density typically has improved strength, shielding properties, shape, definition, etc. of the final sintered product or shaped article formed by 3D printing.

In one embodiment, a selected particulate having specified particle metallurgy can be combined with a specific amount of an interfacial modifier to form a coating of the modifier on a particle and combined with a thermoplastic polymer to form a green body by injection molding prior to sintering.

In another embodiment a selected particulate having specified particle metallurgy can be combined with a specific amount of an interfacial modifier to form a coating of the modifier on a particle and combined with a thermoplastic polymer to form a wire or feedstock useful for 3D printing.

In one embodiment, a selected particulate having specified particle metallurgy can be combined with a specific amount of an interfacial modifier to form a coating of the modifier on a particle and combined with a thermoplastic polymer to form a green body by press and sintering techniques prior to sintering.

In another embodiment, an extrusion process can be used with the interfacially modified particulate to obtain improved processing properties. Using the interfacial modifier, the extrusion produced products and injection molding products, including the green product, filaments, and the final sintered product, can be obtained with minimum excluded volume and maximum particulate packing densities.

For the purpose of this disclosure, the term "green strength" or "green product" indicates the nature of the property or product when initially formed in an injection molding processing prior to being heated or sintered to form the final shaped article.

The term "final shaped article" as used in this disclosure refers to the final product of the process, such that a final product is made by first forming a green product and then sintering or heating the green product until it forms particle-to-particle bonding, necking, resulting in the final product shape.

For purposes of this disclosure, the term "feedstock" refers to material that is useful as material to form the roads or layers during 3D printing or deposition manufacture of an article. Feedstock material may have a circular, such as filaments or wire, or non-circular cross-sectional area, such as strips.

For the purpose of this disclosure, the term "filament" also called a "wire" refers to an elongated article having a cross-section and an indeterminate length. A cross-section can be round, elliptical, oval, triangular, rectangular, or can have an undefined or randomly shaped cross-section. The major dimension the cross-section can be at least about 0.1 millimeters it is often about 0.5 to either 1, 1.5, 2, 2.5, 3, 3.5, 4, 4.5, 5, 5.5, 6, 6.5, 7.0, 7.5, 8, 8.5, 9, 9.5 or 10 millimeters. The term "major dimension" refers to the largest dimension traversing the cross-sectional area in the filament. The term "indeterminate length" refers to a filament having a length substantially longer than its major dimension. Such a filament can be produced and stored in reels or other storage units upon which lengthy sections of filament are easily maintained and later dispensed for use in 3-D filament manufacturing.

For the purpose of this disclosure, the term "particulate" refers to a collection of finely divided particles. The particulate has a range of sizes and morphologies. The maximum particle size is less than 500 microns. The particulate, coated with interfacial modifier, is dispersed into a thermoplastic polymer. When used in a three-dimensional manufacturing technique, the filament or wire comprising the particulate is sintered at elevated temperature to form a desired object.

For the purpose of this disclosure, the term "elevated temperature" refers to a temperature sufficient or thermal process to cause the temperature driven removal of polymeric materials, also called "debinding" from the filament or wire that is also sufficient to cause the particulate to form a solid object. Such object formation can occur by any temperature driven particulate bonding including softening, melting, particle to particle edge fusion For the purpose of this disclosure, the term "x-y plane" generally refers to a horizontally positioned claim orthogonal to the force of gravity. The z-direction generally refers to the direction parallel to the force of gravity and substantially orthogonal to the x-y plane.

For the purpose of this disclosure, the term "particulate" generally refers to a collection of particles with a defined particle size.

For the purpose of this disclosure, the term "object" or "part" generally refers to the product made using the filament or wire of the disclosure after sintering. For the purpose of this disclosure, the term "pre-form object" generally refers to an object or part prior to sintering.

For the purpose of this disclosure, the term "mechanically shaped" generally refers to any modification in shape of a preform object during filament deposition or after filament deposition is complete.

For the purpose of this disclosure, the term "nonoxidizing atmosphere" generally refers to an atmosphere devoid of oxygen and can comprise a substantial vacuum, nitrogen, hydrogen, a noble gas or mixtures thereof. The term "reducing atmosphere" also includes nonoxidizing characteristics but also includes the chemical nature that only the actions involving electrons can occur. A reducing atmosphere comprises gases such as hydrogen, carbon monoxide, and other gaseous reactants. One aspect of a reducing atmosphere is that it can cause the removal of oxygen from a metal or metal oxide.

The inorganic, ceramic or metallic particles typically have a particle size that ranges from about 2 to 500, 2 to 400, 2 to 300, 2 to 200, or 2 to 100 microns, 4 to 300, 4 to 200, or 4 to 100 microns, and often 5 to 250, 5 to 150, 5 to 100, 5 to 75, or 5 to 50 microns. A combination of a larger and a smaller particle wherein there is about 0.1 to 25 wt. % of the smaller particle and about 99.9 to about 75 wt. % of larger particles can be used where the ratio of the diameter of the larger particles to the ratio of the smaller is about 2:1, 3:1, 4:1, 5:1, 6:1 or 7:1. In some embodiments there may be three or more components of particle sizes such as 49:7:1 or 343:49:7:1. In other embodiments there may be a continuous gradient of wide particle size distributions to provide higher packing densities or packing fractions. These ratios will provide optimum self-ordering of particles within the polymer phase leading to tunable particle fractions within the composite material. The self-ordering of the particles is improved with the addition of interfacial modifier as a coating on the surface of the particle.

The packing density or particle fraction of particles in the composite material varies to specifications required for the utility of the final shaped product as formed via injection molding or 3D printing. Values for packing density, volume percent, may be greater than 50, 55, 65, 70 75, 80, 85, 90, 95, or 99%. Procedures to measure the loading ratio of treated, or coated, particles in polymer is calculated based upon pyncnometer density and powder press density, as shown in Equation 1.

$$\text{Maximum Loading} = \frac{\text{Powder Puck Density}}{\text{Pycnometer Density}} \quad \text{(Eq. 1)}$$

We believe an interfacial modifier is a surface chemical treatment. In one embodiment, the interfacial modifier is an organic material that provides an exterior coating on the particulate promoting the close association of particulate to other particulate without intra-particulate bonding or attachment. Minimal amounts of the interfacial modifier can be used including about 0.005 to 8 wt.-%, 0.005 to 4 wt-%, 0.010 to 3 wt. %, 0.02 to 3 wt. % or about, 0.02 to 2 wt. %. The interfacial modifier coats but does not form any substantial covalent bonding among or to other particulate or polymer.

DETAILED DISCUSSION

Interfacial modifiers provide the close association of the particulate within a particle distribution of one or many sizes. Interfacial modifiers used in the application fall into broad categories including, for example, stearic acid derivatives, titanate compounds, zirconate compounds, hafnium compounds, samarium compounds, strontium compounds, neodymium compounds, yttrium compounds, phosphonate compounds, aluminate compounds. Useful, aluminate, phosphonate, titanate and zirconate compounds useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur. Commonly the titanate and zirconate compounds contain from about 2 to about 3 ligands comprising hydrocarbyl phosphate esters and/or hydrocarbyl sulfonate esters, commonly 3 of such ligands and about 1 to 2 hydrocarbyl ligands, commonly 1 hydrocarbyl ligand.

In one embodiment the interfacial modifier used is a type of organo-metallic material such as organo-titanate, organo-boron, organo-aluminate, organo-strontium, organo-neodymium, organo-yttrium, or organo-zirconate compounds. The specific type of organo-titanate, organo-aluminate, organo-hafnium, organo-strontium, organo-neodymium, organo-yttrium, or organo-zirconate compounds may be referred to as organo-metallic compounds are distinguished by the presence of at least one hydrolysable group and at least one organic moiety. Mixtures of the organo-metallic materials may be used. The mixture of the interfacial modifiers may be applied inter- or intra-particle, which means at least one particle may has more than one interfacial modifier coating the surface (intra), or more than one interfacial modifier coating may be applied to different particles or particle size distributions (inter). These types of compounds may be defined by the following general formula:

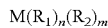

$M(R_1)_n(R_2)_m$ wherein M is a central atom selected from, for example, Ti, Al, Hf, Sa, Sr, Nd, Yt, and Zr; $R_1$ is a hydrolysable group; $R_2$ is a group consisting of an organic moiety; wherein the sum of m+n must equal the coordination number of the central atom and where n is an integer ≥1 and m is an integer ≥1.

Particularly $R_1$ is an alkoxy group having less than 12 carbon atoms. Useful are those alkoxy groups, which have less than 6, and most Useful are alkoxy groups having 1-3 C atoms. $R_2$ is an organic group including between 6-30, commonly 10-24 carbon atoms optionally including one or more hetero atoms selected from the group consisting of N, O, S and P. $R_2$ is a group consisting of an organic moiety, which is not easily hydrolysed and often lipophilic and can be a chain of an alkyl, ether, ester, phospho-alkyl, phospho-alkyl, phospho-lipid, or phospho-amine. The phosphorus may be present as phosphate, pyrophosphato, or phosphito groups. Furthermore, $R_2$ may be linear, branched, cyclic, or aromatic.

Useful titanate and zirconate compounds include isopropyl tri(dioctyl)pyrophosphato titanate (available from Kenrich Chemicals under the designation KR38S), neopentyl (diallyl)oxy, tri(dodecyl)benzene-sulfonyl titanate (available from Kenrich Chemicals under the trademark and designation LICA 09), neopentyl(diallyl)oxy, trioctylphosphato titanate (available from Kenrich Chemicals under the trademark and designation LICA 12), neopentyl(diallyl)oxy, tri (dodecyl)benzene-sulfonyl zirconate (available from Kenrich Chemicals under the designation NZ 09), neopentyl (diallyl)oxy, tri(dioctyl)phosphato zirconate (available from Kenrich Chemicals under the designation NZ 12), and neopentyl(diallyl)oxy, tri(dioctyl)pyro-phosphato zirconate (available from Kenrich Chemicals under the designation NZ 38). One embodiment is titanate is tri(dodecyl)benzene-sulfonyl titanate (available from Kenrich Chemicals under the designation LICA 09). The interfacial modifiers modify the particulate in the materials with the formation of a layer on the surface of the particle reducing the intermolecular forces, improving the tendency of particle to mix with other particles, and resulting in increased material density. Interfacial modifier coatings on particulate, in contrast with uncoated particulate, maintain or improve the viscoelastic properties of the base polymer in the composite material. For example, such viscoelastic properties may be melt flow, elasticity, tensile modulus, storage modulus, elastic-plastic deformation and tensile elongation can be present in the composite material. Interfacial modifiers coatings on particulate also improve the rheology of the composite material causing less wear on machinery and other technology useful in melt processing. Further, the interfacial modifier coatings on particulate provide an inert surface on the particulate substrate. The coated particulate is unreactive to the base polymer or other additives in the composite material. In a sense, the interfacial modifier coatings on particulate make the particulate invisible or immiscible to the base polymer or other additives in contrast to particulate that is uncoated. Density is maximized as the number of close associations between the particulate surfaces.

The choice of interfacial modifiers is dictated by particulate, polymer, and application. The particle is completely and uniformly coated with the interfacial modifier even if having substantial surface morphology. By substantial surface morphology, visual inspection would show a rough surface to a particle substrate where the surface area of the rough substrate, taking into account the topography of the surface, is substantially greater than the surface area of a smooth substrate. Amounts of the interfacial modifier can be used including about 0.005 to 10 wt.-%, 0.005 to 5 wt-%, 0.005 to 4 wt-%, 0.010 to 3 wt. %, 0.02 to 3 wt. % or about, 0.02 to 2 wt. %. Interfacial modifying coatings or surface treatments may be applied to any particle type such as ceramic, inorganic, metal particulate or their mixtures. The maximum density of a material in the composite material with the polymer is a function of the densities of the materials and the volume fractions of each. Higher density materials are achieved by maximizing per unit volume of the materials with the highest densities and can be measured by application of Equation 1.

In the case of metals, the materials may be refractory metals such as niobium, molybdenum, tantalum, tungsten and rhenium and in some instances titanium, vanadium, chromium, zirconium, hafnium, ruthenium, osmium and iridium. These materials are extremely hard, have a high melting point, usually above 1500° C., and are difficult to deform. These materials may be formed into usable shapes using traditional powder metallurgy equipment. However, the maximum densities achievable with conventional materials will be less then optimum and there may be excessive shrinkage of the particulate mass upon sintering. When forming shaped articles, or linear extrudate, the inter-particle interaction dominates the behavior of the total material. Particles contact one another and the combination of irregular shape, interacting sharp edges, soft surfaces (resulting in gouging, points are usually work hardened) and the friction between the surfaces prevent further or optimal packing. Therefore, maximizing properties, such as increasing the flow properties, reducing viscosity, the particulate mass of a material, is a function of softness of surface, hardness of edges, point size of point (sharpness), surface friction force and pressure on the material, circularity, and the usual, shape size distribution. In general, these effects are defined as particle surface energy interactions. Such interactions can be inhibitory to forming materials with requisite properties such as high density or low porosity. Further because of this inter-particle friction, the forming pressure will decrease exponentially with distance from the applied force.

Interfacially modifying chemistries are capable of modifying the surface of the particulate populations by a variety of means. For example, there may be coordination bonding, Van der Waals forces, covalent bonding, or a combination of all three at the surface of the particulate with the interfacial modifier. The interfacial modifier will be completely and uniformly associated with the surface of the particulate. In some instances, the surface of the particulate will be completely coated by the interfacial modifier. After treatment with the interfacial modifier, the surface of the particle behaves as a particle of the non-reacted end of the interfacial modifier. Thus the interfacial modifier associates with the surface of the particle and in some cases the chemistry of the interfacial modifier may form bonds with the surface of the particle thereby modifying the surface energy of the bulk particulate relative to the surface characteristics of the interfacial modifier. However, the interfacial modifier surface formed on a particle is non-reactive to other particles with a similar interfacially modified surface as well as to the polymer matrix. With interfacial modifiers the topography of particle surfaces, surface morphology, such as for example, roughness, irregular shape etc., is modified to reduce these inter-particle surface effects. The particulate distribution with individual particles having an interfacially modified surface, although perhaps comprising different particle sizes, has a more apparent homogeneous surface in comparison to non-interfacially modified particulate. The interfacial modifier reduces, such as for example, surface energies on the particle surface permitting a denser packing of particle distributions. In one embodiment the reduction of particle surface energy due to interfacial modification of particle surfaces provides self-ordering of different particle sizes to proceed. In contrast, articles without interfacial modification will resist self-ordering. These organic materials of the interfacial modifiers not only are non-reactive to each other but also reduce the friction between particles thereby preventing gouging and allowing for greater freedom of movement among and between particles in comparison to particles that do not have a coating of interfacial modifier on their surface. These phenomena allow the applied shaping force to reach deeper into the form resulting in a more uniform pressure gradient during processing.

Metals

The powder particles can consist of a single crystal or many crystal grains of various sizes. The micro structure including a crystal grain size shape and orientation can also vary from metal to metal. The particle metallurgy depends on method of the particle fabrication. Metals that can be used in powder metal technology include copper metal, iron metal, nickel metal, tungsten metal, molybdenum, and metal alloys thereof and bi-metallic particles thereof. Often, such particles have an oxide layer that can interfere with shape formation. The metal particle composition used in particle metallurgy typically includes a large number of particulate size materials. The particles that are acceptable molding grade particulate include particle size, particle size distribution, particle morphology, including reference index and aspect ratio. Further, the flow rate of the particle mass, the green strength of the initial shaped object, the compressibility of the initial shaped object, the removability or ejectability of the shaped object from the mold, and the dimensional stability of the initial shape during processing and later sintering is also important.

Metal particulate that can be used in the composite materials for metal injection molding or 3D printing include tungsten, uranium, osmium, iridium, platinum, rhenium, gold, neptunium, plutonium and tantalum. Other metals that can be used are iron, copper, nickel, cobalt, tin, bismuth and zinc. These metals may be used alone or in conjunction with other metals, inorganic minerals, ceramics, or glass bubbles and spheres. The end use of the material to make the shaped article would be the determining factor. While an advantage is that non-toxic or non-radioactive materials can be used as a substitute for lead and depleted uranium where needed, lead and uranium can be used when the materials have no adverse impact on the intended use. Another advantage is the ability to create bimetallic or higher materials that use two or more metal materials that cannot naturally form an alloy. In another embodiment, using the Press and Sinter process, the coated particulate can be formed into unique shapes for fuel pellets to enhance combustion. A variety of properties can be tailored through a careful selection of metal or a combination of metals and the toxicity or radioactivity of the materials can be designed into the materials as desired. These materials are not used as large metal particles, but are typically used as small metal particles, commonly called metal particulates. Such particulates have a relatively low aspect ratio and are typically less than about 1:3 aspect ratio. An aspect ratio is typically defined as the ratio of the greatest dimension of the particulate divided by the smallest dimension of the particulate. Generally, spherical particulates are commonly used; however, sufficient packing densities can be obtained from relatively uniformly shaped particles in a dense structure. In some embodiments, the particles may be ball milled to provide mostly round particles. In some instances the ball-milled particle can have some flat spots. In Press and Sinter processes, heterogeneous shapes and sizes are more useful then spherical particulate. Using the interfacial modifier coating enables the part or shaped article to be ejected from the die with less force than a part or article that is not coated with the interfacial modifier.

Ceramics

Another important inorganic material that can be used as a particulate includes ceramic materials. Ceramics are typically classified into three distinct material categories, including aluminum oxide and zirconium oxide ceramic, metal carbide, metal boride, metal nitride, metal silicide compounds, and ceramic material formed from clay or clay-type sources. Examples of useful technical ceramic materials are selected from barium titanate, boron nitride, lead zirconate or lead tantalite, silicate aluminum oxynitride, silica carbide, silica nitride, magnesium silicate, titanium carbide, zinc oxide, and/or zinc dioxide (zirconia) particularly useful ceramics of use comprise the crystalline ceramics. Other embodiments include the silica aluminum ceramic materials that can be made into useful particulate. Such ceramics are substantially water insoluble and have a particle size that ranges from about 10 to 500 microns, have a density that ranges from about 1.5 to 3 gram/cc and are commercially available. In an embodiment, soda lime glass may be useful. One useful ceramic product is the 3M ceramic microsphere material such as the g-200, g-400, g-600, g-800 and g-850 products.

Magnetic composites can be made of any magnetic particle material that when formed into a composite can be magnetized to obtain a permanent magnetic field. These particles are typically inorganic and can be ceramic. Magnetite is a mineral, one of the two common naturally occurring oxides of Iron (chemical formula $Fe_3O_4$) and a member of the spinel group. Magnetite is the most magnetic of all the naturally occurring minerals. Alnico magnet alloy is largely comprised of aluminum, iron, cobalt and nickel. Alnico is a moderately expensive magnet material because of the cobalt and nickel content. Alnico magnet alloy has a high maximum operating temperature and a very good corrosion resistance. Some grades of Alnico alloy can operate upwards of 5500° C. Samarium cobalt (SmCo) and Neodymium Iron Boron (NdFeB) are called rare earth because neodymium and samarium are found in the rare earth elements on the periodic table. Both samarium, cobalt, and neodymium magnet alloys are powdered metals which are compacted in the presence of a strong magnetic field and are then sintered. Ceramic magnet material (Ferrite) is strontium ferrite. Ceramic magnet material (Ferrite) is one of the most cost effective magnetic materials manufactured in industry. The low cost is due to the cheap, abundant, and non-strategic raw materials used in manufacturing this alloy. The permanent ceramic magnets made with this material lend themselves to large production runs. Ceramic magnet material (Ferrite) has a fair to good resistance to corrosion and it can operate in moderate heat.

Useful magnetic particles are ferrite materials. Ferrite is a chemical compound consisting of a ceramic inorganic oxide material. Ferric oxide commonly represented as $Fe_2O_3$ is a principal component. Useful ferrite materials of the disclosure have at least some magnetic character and can be used as permanent magnet ferrite cores for transformers and as memory components in tape and disc and in other applications. Ferrite materials are ferromagnetic ceramic compounds generally derived from iron oxides. Iron oxide compounds are materials containing iron and oxygen atoms. Most iron oxides do not exactly conform to a specific molecular formula and can be represented as $Fe_2O_3$ or $Fe_3O_4$ as well as compounds as $Fe_xO_y$ wherein X is about 1 to 3 and Y is about 1 to 4. The variation in these numbers result from the fundamental nature of the ferric oxide material which invoke often does not have precisely defined ratios of iron to oxygen atoms. These materials are spinel ferrites and are often in the form of a cubic crystalline structure. The crystalline usually synthetic ceramic material typically is manufactured by manufacturing a ferric oxide material and at least one other metallic oxide material generally made from a metal oxide wherein the model is a divalent metal. Such metals include for example magnesium, calcium, barium, chrome manganese, nickel, copper, zinc, molybdenum and others. The Useful metals are magnesium, calcium and barium.

Useful ferrites are typically prepared using ceramic techniques. Often the oxides are carbonates of the iron or divalent oxides are milled until a fine particulate is obtained. The fine particulate is dried and pre-fired in order to obtain the homogenous end product. The ferrite is then often heated to form the final spinel crystalline structure. The preparation of ferrites is detailed in U.S. Pat. No. 2,723,238 and U.S. Pat. No. 2,723,239. Ferrites are often used as magnetic cores in conductors and transformers. Microwave devices such as glycerin tubes can use magnetic materials. Ferrites can be used as information storage in the form of tape and disc and can be used in electromagnetic transistors and in simple magnet objects. One useful magnetic materials is known as zinc ferrite and has the formula $ZnOFe_{23}$. Another useful ferrite is the barium ferrite that can be represented as $BaO:6Fe_2$ or $BaFe_{12}O_{19}$. Other ferrites includes soft ferrites such as manganese-zinc ferrite ($Mn_a Zn_{(1-a)} Fe_2O_4$) and nickel zinc ferrite $Ni_aZn_{(1-a)}Fe_2O_4$. Other useful ferrites are hard ferrites including strontium ferrite $SrFe_2O_4$, cobalt ferrite $CoFe_2O_4$.

In some greater detail, ferrites are typically produced by heating a mixture of finely divided metal oxide, carbonate or hydroxide with ferrite powder precursors when pressed into a mold. During the heating process the material is calcined. In calcination volatile materials are often driven off leaving the inorganic oxides in the appropriate crystal structure. Divalent metal oxide material is produced from carbonate sources. During calcination a mixture of oxide materials is produced from a heating or sintering of the blend, carbon dioxide is driven off leaving the divalent metal oxide. Such considering our high heating processes similar to the firing of ceramic materials generally.

We have further found that a blend of the magnetic particle and one, two, three or more particles in particulate form can obtain important composite properties from all of particulate materials in a polymer composite structure. For example, a tungsten composite or other high density metal particulate can be blended with a second metal particulate that provides to the relatively stable, non-toxic tungsten material, additional properties including a low degree of radiation in the form of alpha, beta or gamma particles, a low degree of desired cytotoxicity, a change in appearance or other beneficial properties. One advantage of a bimetallic composite is obtained by careful selection of proportions resulting in a tailored magnetic strength for a particular end use. Such composites each can have unique or special properties. These composite processes and materials have the unique capacity and property that the composite acts as an alloy a blended composite of two or three different metals inorganic minerals that could not, due to melting point and other processing difficulties, be made into an alloy form without the disclosed embodiments.

Minerals

Examples of minerals that are useful in the embodiment include compounds such as Carbide, Nitride, Silicide and Phosphide; Sulphide, Selenide, Telluride, Arsenide and Bismuthide; Oxysulphide; Sulphosalt, such as Sulpharsenite, Sulphobismuthite, Sulphostannate, Sulphogermanate, Sulpharsenate, Sulphantimonate, Sulphovanadate and Sulphohalide; Oxide and Hydroxide; Halides, such as Fluoride, Chloride, Bromide and Iodide; Fluoroborate and Fluorosilicate; Borate; Carbonate; Nitrate; Silicate; Silicate of Aluminum; Silicate Containing Aluminum or other Metals;

Silicates containing other Anions; Niobate and Tantalate; Phosphate; Arsenate such as arsenate with phosphate (without other anions); Vanadate (vanadate with arsenate or phosphate); Phosphates, Arsenates or Vanadate; Arsenite; Antimonate and Antimonite; Sulphate; Sulphate with Halide; Sulphite, Chromate, Molybdate and Tungstate; Selenite, Selenate, Tellurite, and Tellurate; Iodate; Thiocyanate; Oxalate, Citrate, Mellitate and Acetates include the arsenide, antimonide and bismuthide of e.g., metals such as Li, Na, Ca, Ba, Mg, Mn, Al, Ni, Zn, Ti, Fe, Cu, Ag and Au.

Garnet, is an important mineral and is a nesosilicate that complies with general formula $X_3Y_2(SiO_4)_3$. The X is divalent cation, typically $Ca^{2+}$, $Mg^{2+}$, $Fe^{2+}$ etc. and the Y is trivalent cation, typically $Al^{3+}$, $Fe^{3+}$, $Cr^{3+}$, etc. in an octahedral/tetrahedral framework with $[SiO_4]^{4-}$ occupying the tetrahedral structure. Garnets are most often found in the dodecahedral form, less often in trapezo-hedral form.

One particularly useful inorganic material used are metal oxide materials including aluminum oxide or zirconium oxide. Aluminum oxide can be in an amorphous or crystalline form. Aluminum oxide is typically formed from sodium hydroxide, and aluminum ore. Aluminum oxide has a density that is about 3.8 to 4 g-cc and can be obtained in a variety of particle sizes that fall generally in the range of about 10 to 1,000 microns. Zirconium oxide is also a useful ceramic or inorganic material. Zirconium dioxide is crystalline and contains other oxide phases such as magnesium oxide, calcium oxide or cerium oxide. Zirconium oxide has a density of about 5.8 to 6 $gm\text{-}cm^{-3}$ and is available in a variety of particle sizes. Another useful inorganic material concludes zirconium silicate. Zirconium silicate $(ZrSiO_4)$ is an inorganic material of low toxicity that can be used as refractory materials. Zirconium dioxide has a density that ranges from about 4 to 5 gm/cc and is also available in a variety of particulate forms and sizes.

One important inorganic material that can be used as a particulate in another embodiment includes silica, silicon dioxide $(SiO_2)$. Silica is commonly found as sand or as quartz crystalline materials. Also, silica is the major component of the cell walls of diatoms commonly obtained as diatomaceous earth. Silica, in the form of fused silica or glass, has fused silica or silica line-glass as fumed silica, as diatomaceous earth or other forms of silica as a material density of about 2.7 $gm\text{-}cm^{-3}$ but a particulate density that ranges from about 1.5 to 2 $gm\text{-}cm^{-3}$.

Glass Spheres

Glass spheres (including both hollow and solid) are another useful non-metal or inorganic particulate. These spheres are strong enough to avoid being crushed or broken during further processing, such as by high pressure spraying, kneading, extrusion or injection molding. In many cases these spheres have particle sizes close to the sizes of other particulate if mixed together as one material. Thus, they distribute evenly, homogeneously, within the composite upon introduction and mixing. The method of expanding solid glass particles into hollow glass spheres by heating is well known. See, e.g., U.S. Pat. No. 3,365,315 herein incorporated by reference in its entirety.

Useful hollow glass spheres having average densities of about 0.1 $grams\text{-}cm^{-3}$ to approximately 0.7 $grams\text{-}cm^{-3}$ or about 0.125 $grams\text{-}cm^{-3}$ to approximately 0.6 $grams\text{-}cm^{-3}$ are prepared by heating solid glass particles.

For a product of hollow glass spheres having a particular desired average density, there is an optimum sphere range of sizes of particles making up that product which produces the maximum average strength. A combination of a larger and a smaller glass sphere wherein there is about 0.1 to 25 wt. % of the smaller sphere and about 99.9 to about 75 wt. % of larger particles can be used were the ratio of the diameter of the larger particles to the ratio of the smaller is about 2:1, 3:1, 4:1, 5:1, 6:1 or 7:1.

Glass spheres used within the embodiments can include both solid and hollow glass spheres. All the particles heated in the furnace do not expand, and most hollow glass-sphere products are sold without separating the hollow from the solid spheres.

Useful glass spheres are hollow spheres with relatively thin walls. Such spheres typically comprise a silica-line-oral silicate glass and in bulk form a white powdery particulate. The density of the hollow spherical materials tends to range from about 0.1 to 0.8 g/cc that is substantially water insoluble and has an average particle diameter that ranges from about 10 to 250 microns.

Polymers

A large variety of polymer materials can be used with the interfacially modified particulate of the embodiment. For the purpose of this application, a polymer is a general term covering either a thermoset or a thermoplastic polymer. We have found that polymer materials that are useful include both condensation polymeric materials and addition or vinyl polymeric materials. Crystalline or semi-crystalline polymers, copolymers, blends and mixtures are useful. Included are both vinyl and condensation polymers, and polymeric alloys thereof. Vinyl polymers are typically manufactured by the polymerization of monomers having an ethylenically unsaturated olefinic group. Condensation polymers are typically prepared by a condensation polymerization reaction which is typically considered to be a stepwise chemical reaction in which two or more molecules combined, often but not necessarily accompanied by the separation of water or some other simple, typically volatile substance. Such polymers can be formed in a process called polycondensation. The polymer has a density of at least 0.85 $gm\text{-}cm^{-3}$, however, polymers having a density of greater than 0.96 are useful to enhance overall product density. A density is often up to 1.7 or up to 2 $gm\text{-}cm^{-3}$ or can be about 1.5 to 1.95 $gm\text{-}cm^3$ depending on metal particulate and end use.

Vinyl polymers include polyethylene, polypropylene, polybutylene, polyvinyl alcohol (PVA), acrylonitrile-butadiene-styrene (ABS), poly(methyl-pentene), (TPX®), polybutylene copolymers, polyacetyl resins, polyacrylic resins, homopolymers or copolymers comprising vinyl chloride, vinylidene chloride, fluorocarbon copolymers, etc. Condensation polymers include nylon, phenoxy resins, polyarylether such as polyphenylether, polyphenylsulfide materials; polycarbonate materials, chlorinated polyether resins, polyethersulfone resins, polyphenylene oxide resins, polysulfone resins, polyimide resins, thermoplastic urethane elastomers and many other resin materials.

Condensation polymers that are useful include polyamides, polyamide-imide polymers, polyarylsulfones, polycarbonate, polybutylene terephthalate, polybutylene naphthalate, polyetherimides (such as, for example, ULTEM®), polyethersulfones, polyethylene terephthalate, thermoplastic polyimides, polyphenylene ether blends, polyphenylene sulfide, polysulfones, thermoplastic polyurethanes and others. Useful condensation engineering polymers include polycarbonate materials, polyphenyleneoxide materials, and polyester materials including polyethylene terephthalate, polybutylene terephthalate, polyethylene naphthalate and polybutylene naphthalate materials. Useful polycarbonate materials should have a melt index between 0.5 and 7 gms/10 min, commonly between 1 and 5 gms/10 min.

A variety of polyester condensation polymer materials including polyethylene terephthalate, polybutylene terephthalate, polyethylene naphthalate, polylactic acid, polybutylene naphthalate, etc. can be useful in the composites. Such materials have a Useful molecular weight characterized by melt flow properties. Useful polyester materials have a viscosity at 265° C. of about 500-2000 cP, commonly about 800-1300 cP.

Polyphenylene oxide materials are engineering thermoplastics that are useful at temperature ranges as high as 330° C. Polyphenylene oxide has excellent mechanical properties, dimensional stability, and dielectric characteristics. A Useful melt index (ASTM 1238) for the polyphenylene oxide material useful typically ranges from about 1 to 20, commonly about 5 to 10 gm/10 min. The melt viscosity is about 1000 cP at 265° C.

Another class of thermoplastic includes styrenic copolymers. The term styrenic copolymer indicates that styrene is copolymerized with a second vinyl monomer resulting in a vinyl polymer. Such materials contain at least a 5 mol-% styrene and the balance being 1 or more other vinyl monomers. An important class of these materials is styrene acrylonitrile (SAN) polymers. SAN polymers are random amorphous linear copolymers produced by copolymerizing styrene acrylonitrile and optionally other monomers. Emulsion, suspension and continuous mass polymerization techniques have been used. SAN copolymers possess transparency, excellent thermal properties, good chemical resistance and hardness. These polymers are also characterized by their rigidity, dimensional stability and load bearing capability. Olefin modified SAN's (OSA polymer materials) and acrylic styrene acrylonitriles (ASA polymer materials) are known. These materials are somewhat softer than unmodified SAN's and are ductile, opaque, two phased terpolymers that have surprisingly improved weatherability.

ASA polymers are random amorphous terpolymers produced either by mass copolymerization or by graft copolymerization. These materials can also be blended or alloyed with a variety of other polymers including polyvinyl chloride, polycarbonate, polymethyl methacrylate and others. An important class of styrene copolymers includes the acrylonitrile-butadiene-styrene monomers (ABS). These polymers are very versatile family of engineering thermoplastics produced by copolymerizing the three monomers. The styrene copolymer family of polymers has a melt index that ranges from about 0.5 to 25, commonly about 0.5 to 20.

Important classes of engineering polymers that are useful include acrylic polymers. Acrylics comprise a broad array of polymers and copolymers in which the major monomeric constituents are an ester acrylate or methacrylate. These polymers are often provided in the form of hard, clear sheet or pellets. A Useful acrylic polymer material that is useful in an embodiment has a melt index of about 0.5 to 50, commonly about 1 to 30 gm/10 min.

Vinyl polymer polymers include acrylonitrile; polymer of alpha-olefins such as ethylene, high density polyethylene (HDPE), propylene, etc.; chlorinated monomers such as vinyl chloride, vinylidene dichloride, acrylate monomers such as acrylic acid, methylacrylate, methyl methacrylate, acrylamide, hydroxyethyl acrylate, and others; styrenic monomers such as styrene, alpha methyl styrene, vinyl toluene, etc.; vinyl acetate; and other commonly available ethylenically unsaturated monomer compositions.

Polymer blends or polymer alloys can be useful in manufacturing the pellet or linear extrudate of the embodiments. Such alloys typically comprise two miscible polymers blended to form a uniform composition. Scientific and commercial progress in the area of polymer blends has led to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature (Tg). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented.

The primary requirement for the substantially thermoplastic engineering polymer material is that it retains sufficient thermoplastic properties, such as viscosity and stability, to permit melt processing, such as melt blending, with a metal particulate, permit formation of linear extrudate pellets, and to permit the composition material or pellet to be extruded or injection molded in a thermoplastic process forming the useful product or green product. Engineering polymer and polymer alloys are available from a number of manufacturers including Dyneon LLC, B.F. Goodrich, G.E., Dow, PolyOne, Mitsui, and DuPont.

Typically, polyesters are manufactured with a styrene concentration or other monomer concentration producing polymer having an uncured viscosity of 200-1,000 mPa·s (cP). Specialty polymers may have a viscosity that ranges from about 20 cP to 2,000 cP.

Phenolic polymers can also be used in the manufacture of the structural members. Phenolic polymers typically comprise a phenol-formaldehyde polymer. Such polymers are inherently fire resistant, heat resistant and are low in cost. Phenolic polymers are typically formulated by blending phenol and less than a stoichiometric amount of formaldehyde. These materials are condensed with an acid catalyst resulting in a thermoplastic intermediate polymer called NOVOLAK.

Useful fluoropolymers are perflourinated and partially fluorinated polymers made with monomers containing one or more atoms of fluorine, or copolymers of two or more of such monomers. Common examples of fluorinated monomers useful in these polymers or copolymers include tetrafluoroethylene (TFE), hex afluoropropylene (HFP), vinylidene fluoride (VDF), perfluoroalkylvinyl ethers such as perfluoro-(n-propyl-vinyl) ether (PPVE) or perfluoromethylvinylether (PMVE). Other copolymerizable olefinic monomers, including non-fluorinated monomers, may also be present.

Thermoplastics include polyvinylchloride, polyphenylene sulfite, acrylic homopolymers, maleic anhydride containing polymers, acrylic materials, vinyl acetate polymers, diene containing copolymers such as 1,3-butadiene, 1,4-pentadiene, halogen or chlorosulfonyl modified polymers or other polymers. Condensation polymeric thermoplastics can be used including polyamides, polyesters, polycarbonates, polysulfones and similar polymer materials by reacting end groups with silanes having amino-alkyl, chloroalkyl, isocyanato or similar functional groups.

Particularly useful materials for the fluoropolymers are TFE-HFP-VDF terpolymers (melting temperature of about 100 to 260° C.; melt flow index at 265° C. under a 5 kg load is about 1-30 g-10 min$^{-1}$.), hexafluoropropylene-tetrafluoroethylene-ethylene (HTE) terpolymers (melting temperature about 150 to 280° C.; melt flow index at 297° C. under a 5 kg load of about 1-30 g-10 min$^{-1}$.), ethylene-tetrafluoroethylene (ETFE) copolymers (melting temperature about 250 to 275° C.; melt flow index at 297° C. under a 5 kg load of about 1-30 g-10 min$^{-1}$.), hexafluoropropylene-tetrafluoroethylene (FEP) copolymers (melting temperature about 250 to 275° C.; melt flow index at 372° C. under a 5 kg load of about 1-30 g-10 min$^{-1}$.), and tetrafluoroethylene-perfluoro(alkoxy alkane) (PFA) copolymers (melting temperature about 300 to 320° C.; melt flow index at 372° C. under a 5 kg load of about 1-30 g-10 min$^{-1}$.). Each of these fluoropolymers is commercially available from Dyneon LLC, Oakdale, Minn. The TFE-HFP-VDF terpolymers are sold under the designation "THV".

Also useful are vinylidene fluoride polymers primarily made up of monomers of vinylidene fluoride, including both homo polymers and copolymers. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, and any other monomer that readily copolymerizes with vinylidene fluoride. These materials are further described in U.S. Pat. No. 4,569,978 (Barber) incorporated herein by reference. Useful copolymers are those composed of from at least about 70 and up to 99 mole percent vinylidene fluoride, and correspondingly from about 1 to 30 percent tetrafluoroethylene, such as disclosed in British Patent No. 827,308; and about 70 to 99 percent vinylidene fluoride and 1 to 30 percent hexafluoropropene (see for example U.S. Pat. No. 3,178,399); and about 70 to 99 mole percent vinylidene fluoride and 1 to 30 percent trifluoroethylene Terpolymers of vinylidene fluoride, trifluoroethylene and tetrafluoroethylene such as described in U.S. Pat. No. 2,968,649 and terpolymers of vinylidene fluoride, trifluoroethylene and tetrafluoroethylene are also representative of the class of vinylidene fluoride copolymers which are useful. Such materials are commercially available under the KYNAR trademark from Arkema Group located in King of Prussia, Pa. or under the DYNEON trademark from Dyneon LLC of Oakdale, Minn. Fluorocarbon elastomer materials can also be used in the composite materials. Fluoropolymer contain VF$_2$ and HFP monomers and optionally TFE and have a density greater than 1.8 gm-cm$^{-3}$ fluoropolymers exhibit good resistance to most oils, chemicals, solvents, and halogenated hydrocarbons, and an excellent resistance to ozone, oxygen, and weathering. Their useful application temperature range is −40° C. to 300° C. Fluoroelastomer examples include those described in detail in Lentz, U.S. Pat. No. 4,257,699, as well as those described in Eddy et al., U.S. Pat. No. 5,017,432 and Ferguson et al., U.S. Pat. No. 5,061,965. The disclosures of each of these patents are totally incorporated herein by reference.

Latex fluoropolymers are available in the form of the polymers comprising the PFA, FEP, ETFE, HTE, THV and PVDF monomers. Fluorinated poly(meth)acrylates can generally be prepared by free radical polymerization either neat or in solvent, using radical initiators well known to those skilled in the art. Other monomers which can be copolymerized with these fluorinated (meth)acrylate monomers include alkyl (meth)acrylates, substituted alkyl (meth)acrylates, (meth)acrylic acid, (meth)acrylamides, styrenes, vinyl halides, and vinyl esters. The fluoropolymers can comprise polar constituents. Such polar groups or polar group containing monomers may be anionic, nonionic, cationic, or amphoteric. In general, the more commonly employed polar groups or polar group-containing organic radicals include organic acids, particularly carboxylic acid, sulfonic acid and phosphonic acid; carboxylate salts, sulfonates, phosphonates, phosphate esters, ammonium salts, amines, amides, alkyl amides, alkyl aryl amides, imides, sulfonamides, hydroxymethyl thiols, esters, silanes, and polyoxyalkylenes, as well as other organic radicals such as alkylene or arylene substituted with one or more of such polar groups. The latex fluoropolymers described herein are typically aqueous dispersed solids but solvent materials can be used. The fluoropolymer can combined with various solvents to form emulsion, solution or dispersion in a liquid form. Dispersions of fluoropolymers can be prepared using conventional emulsion polymerization techniques, such as described in U.S. Pat. Nos. 4,418,186; 5,214,106; 5,639,838; 5,696,216 or Modern Fluoropolymers, Edited by John Scheirs, 1997 (particularly pp. 71-101 and 597-614). The liquid forms can be further diluted in order to deliver the desired concentration. Although aqueous emulsions, solutions, and dispersions are Useful, up to about 50% of a cosolvent such as methanol, isopropanol, or methyl perfluorobutyl ether may be added. Commonly, the aqueous emulsions, solutions, and dispersions comprise less than about 30% cosolvent, more commonly less than about 10% cosolvent, and most commonly the aqueous emulsions, solutions, and dispersions are substantially free of cosolvent.

The choice of the polymer for the composite to make the green body for MIM or the feedstock for 3D printing may depend on a wide number of independent and interdependent variables. Understanding of these variables and their interactions may require some preliminary testing such as, for example, melt flow rates, viscosity, and density of the composite material so that the ultimate product meets the performance specifications for the part or object. For example, melting point and softening point of the polymer may be relevant to both composite formulation as well as manufacture of the shaped article resulting from MIM or 3D printing. Additional polymer aspects may include amorphous, crystalline or semi-crystalline character of the base polymer, copolymer or blends.

The waxes useful herein may include paraffin waxes, microcrystalline waxes, high-density low molecular weight polyethylene waxes, by-product polyethylene waxes, Fischer-Tropsch waxes, oxidized Fischer-Tropsch waxes and functionalized waxes such as hydroxyl stearamide waxes and fatty amide waxes. It is common in the art to use the terminology synthetic high melting point waxes to include high-density low molecular weight polyethylene waxes, by-product polyethylene waxes and Fischer-Tropsch waxes.

The manufacture of specific articles or shapes by injection molding or 3D printing from the particulate is dominated by the physical properties of the particulate, such as, for example, size, shape, and morphology, polymer such as, for example, melt flow, and interfacial modifier. The methods of manufacturing the metal particulate are discussed below in conjunction with the discussion of the particulates themselves. But it is understood that these methods of manufacturing, with suitable modifications directed to the components and end use of the product, are appropriate for other types of particulate such as inorganic mineral particulate, glass bubbles and glass spheres, and ceramic particulate.

In an embodiment, a filament or wire is made from the polymer and particulate coated with interfacial modifier. The coated particulate may be metal, ceramic, mineral, glass bubbles, glass spheres or combinations and mixtures. The particulate, interfacial modifier, and polymer stock has been described supra. Composite material is made by adding particulate that has been pre-coated or pre-treated with interfacial modifier to a polymer. Depending on the requirements and specifications for making a shaped article via additive manufacturing or injection molding techniques, the composition of the filament can be 0.005% to 1, 2, 3, 4, 5, 6, 7, 8, 9 or 10 wt. % interfacial modifier, 35% to 40, 55, 60, 65, 70, 75, 80, 85, 90, or 95 wt. % of particulate, and 1, 5, 10, 15, 20, 25, 30, 35, 40, 45, 50, 55, 60, 65 or 70 wt. % of polymer. These components are mixed together to make a composite material and then extruded using an appropriate die to make a filament of a cross section that is suitable to be used in additive manufacturing. Alternatively the composite material can be injection molded to provide a shaped article.

The attributes of the composition of the composite material are many. High volume packing, greater than 60%, 65%, 70%, 75%, 80%, 85%, or 90%, are able to be realized with the compositions of the composite material. With said high volume fractions, the mechanical properties of the composite material are improved, such as greater impact resistance, increased densification, resistance to oxidation, minimal shrinkage and improved sintering characteristics for MIM, Press and Sinter, and other powder metallurgical processes in comparison to materials that contain particulate this is not coated with an interfacial modifier.

In one embodiment, the initial shapes, such as feedstock, or structures are made by consolidating the coated metal particulate polymer composite by heat and/or pressure via extrusion or injection molding. Then, the polymer is removed by thermal, chemical or other means. In a final step, the metal or particulate mass of the composite becomes very similar to the characteristics of the pure particulate in a process known as sintering. At a minimum, the composite consolidation produces a coherent mass of a definitive size and shape for further processing or development. The characteristics of the initial pressed shape or object are influenced by the characteristics of the powder, the grade and manner of pressure application, the maximum pressure applied, the creative time of consolidation, the shape of the die, compaction temperature, and optional additives such as lubricants, alloy agents, dies materials, service conditions and other effects. The composite material comprising polymer and interfacially modified particulate at a high packing fraction has at least some of the characteristics of the underlying polymer viscoelastic properties, such as melt flow, elastic plastic deformation, etc., that allows the green body or feedstock to be formed without excessive pressures or equipment wear. After sintering, the object or shape can be worked, heated, polished, painted or otherwise finished into new shapes or structures.

In another embodiment, the feedstock is fed through extrusion-based additive manufacturing systems for building 3D models. In brief, "additive manufacturing" or "3D printing" is a manufacturing process for making a three-dimensional solid object of virtually any shape from a digital model. 3D printing is achieved using an additive process, where successive layers of material are laid down in different shapes. 3D printing is considered distinct from traditional machining techniques, which mostly rely on the removal of material by methods such as cutting or drilling (subtractive processes). A materials printer usually performs 3D printing processes using digital technology. The 3D printing technology is used for both prototyping and distributed manufacturing with applications in architecture, construction (AEC), industrial design, automotive, aerospace, military, engineering, civil engineering, dental and medical industries, biotech (human tissue replacement), fashion, footwear, jewelry, eyewear, education, geographic information systems, food, and many other fields. While the skilled man understands that we live in a 3D space, in this technology the term 3D refers to a unique manufacturing system as describer above.

Additive manufacturing, or 3D printing, may also be described in several other computer driven manufacturing processes such as Fused Deposition Modeling® (FDM®), PolyJet, Stereolithography (SLA), Selective Laser Melting (SLM), Selective Laser Sintering (SLS), or Direct Metal Laser Sintering (DMLS), and Plastic Freeforming. Fused Deposition Modeling® (FDM®) is a technology commonly used for additive manufacturing. The technology was developed in the late 1980s and was commercialized in 1990.

Currently, FDM® is often applied in modeling, prototyping, and production applications. FDM® uses an "additive" principle. Layers of material, as a polymer filament or metal wire, is unwound from a coil and supplies material to produce a part. FDM® begins with a software process which processes an STL file (stereo-lithography file format), mathematically slicing and orienting the model for the build process. If required by the final product, support structures may be generated. Support structures useful in FDM® can take at least three different forms or combination of forms. In one example, the support structure can be in the part itself such as being a component of the legs for a nozzle used for printing. In another example the support structure may be fusible or may be sintered with the part formed by FDM®. This type of support may be removable from the part during final processing steps or become a component of the part. In a third example, the support structure is necessary for the construction of the part via FDM® but the support material is removable from the final part. An example of this type of use for a support material is a venturi made by FDM® The FDM® machine may dispense multiple materials to achieve different goals. For example, one machine may use one material to build up the model and use another material as a soluble support structure, or one could use multiple colors of the same type of polymer in the same model. The model or part is produced by extruding small beads of polymer material to form layers. The layers of material harden immediately after extrusion from the nozzle. A plastic filament, metal wire, or composite material of an embodiment is unwound from a coil and supplies material to an extrusion nozzle on the additive manufacturing machine. The machine can turn the flow of the material to the nozzle on and off. There is a drive mechanism, typically some type of worm-drive, that feeds the filament into the nozzle at a controlled rate. The nozzle is heated to melt the material. For polymers, the polymers are heated past their glass transition temperature and are then deposited by the extrusion nozzle or printer head. The nozzle can be moved with high precision in both horizontal and vertical directions by a numerically controlled mechanism. The nozzle follows a tool-path controlled by a computer-aided manufacturing (CAM) software package, and the part is built from the bottom up, one layer at a time. Stepper motors or servo motors are typically employed to move and to position the extrusion head. The mechanism used is often an X-Y-Z rectilinear design, although other mechanical designs such as deltabot have been employed. As a printing technology FDM® is very flexible, and it is capable of dealing with small overhangs by the support from lower layers, FDM® generally has some restrictions on the slope of the overhang, and cannot produce unsupported stalactites. The myriad choices of materials, such as ABS, PLA, polycarbonate, polyamides, polystyrene, lignin, among many others, with different trade-offs between strength and temperature properties are available. In an embodiment the composite material comprising ceramic, glass, mineral or metal particles can be formed into a filament and delivered by Fused Deposition Modeling® (FDM®).

Another additive manufacturing process is PolyJet printing. PolyJet printing is a rapid prototyping process where the printers have two or more jetting heads (one set for the model and one set for the support material) that spray outlines of the part, layer by layer. The liquids used are photopolymers, which are cured nearly instantly by a UV lamp within the printer, creating a solid, plastic-like model that is precise and accurate. The support material is a gel-like substance, which is easily washed away. The model has a smooth finish and is ready for sanding, painting, drilling, or tapping. In an embodiment the composite material comprising ceramic, glass, mineral or metal particles can be formed into a filament and delivered by PolyJet processes.

Stereolithography (SLA), also known as optical fabrication, photo-solidification, solid free-form fabrication and solid imaging, is one of the oldest types of additive manufacturing or 3D printing techniques. SLA uses a supply of light-activated polymers as the base material and layer by layer of polymer material is then treated with a light source to solidify the polymer layers. Exposure to the light source, such as an ultraviolet laser light, cures and solidifies the pattern traced on the resin and joins it to the previous layer. One of the advantages of stereolithography is its speed. Functional and useful parts can be manufactured within a day. The length of time it takes to produce one particular part depends on its size and complexity and can last from a few hours to more than a day. Most stereolithography machines can produce parts with a maximum size of approximately 50×50×60 cm (20"×20"×24") and some, such as the "Mammoth" stereolithography machine (which has a build platform of 210×70×80 cm), are capable of producing single parts of more than 2 m in length. Prototypes or parts made by stereolithography are strong enough to be machined and can be used as master patterns for injection molding, thermoforming, blow molding, and various metal casting processes. In an embodiment the composite material comprising ceramic, glass, mineral or metal particles can be formed into a filament and delivered by Stereolithography (SLA).

Selective Laser Melting (SLM) is an additive manufacturing process that uses 3D CAD data as a digital information source and energy in the form of a high-power laser beam, for example an ytterbium fiber laser to create three-dimensional metal parts by fusing fine metallic powders together. Most machines operate with a build chamber of 250 mm in X & Y and up to 350 mm Z (although larger machines up to 500 mm X, Y, Z and smaller machines do exist). The types of materials that can be processed include stainless steel, tool steel, cobalt chrome, titanium & aluminum. All must exist in atomized form and exhibit certain flow characteristics in order to be process capable. In embodiment the IM treated particles, in some embodiments, metallic particles treated with IM, exhibit useful flow characteristics to the SLM process. Applications most suited to the SLM process are complex geometries & structures with thin walls and hidden voids or channels. Advantage can be gained when producing hybrid forms where solid and partially formed or lattice type geometries can be produced together to create a single object, such as a hip stem or acetabular cup or other orthopedic implant where oseointegration is enhanced by the surface geometry. Much of the pioneering work with SLM technologies is on lightweight parts for aerospace where traditional manufacturing constraints, such as tooling and physical access to surfaces for machining, restrict the design of components. SLM allows parts to be built additively to form near net shape components rather than by removing waste material. In an embodiment the composite material comprising ceramic, glass, mineral or metal particles can be formed into a filament and delivered by Selective Laser Melting (SLM).

Selective laser sintering (SLS) is an additive manufacturing technique that uses a laser as the power source to sinter powdered material such as, for example, metal powders, aiming the laser automatically at points in space defined by a 3D model, binding the material together to create a solid structure. The process is similar to direct metal laser sintering (DMLS); the two are instantiations of the same concept but differ in technical details. SLM uses a comparable concept, but in SLM the material is fully melted rather than sintered. SLS permits different properties such as crystal structure, porosity, and so on to be useful in the final part. SLS is a relatively new technology that so far has mainly been used for rapid prototyping and for low-volume production of component parts. In an embodiment the composite material comprising ceramic, glass, mineral or metal particles can be formed into a filament and delivered by Fused Selective Laser Sintering (SLS).

Direct metal laser sintering (DMLS) is an additive manufacturing technique that uses a laser as the power source to sinter powdered material (typically metal), aiming the laser automatically at points in space defined by a 3D model, binding the material together to create a solid structure. The DMLS process is similar to SLS. The two are instantiations of the same concept but differ in technical details. SLM uses a comparable concept, but in SLM the material is fully melted rather than sintered, allowing different properties (crystal structure, porosity, and so on). The DMLS process involves use of a 3D CAD model whereby an stla .STL file is created and sent to the machine's software. A technician works with this 3D model to properly orient the geometry for part building and adds supports structure as appropriate. Once this "build file" has been completed, it is "sliced" into the layer thickness the machine will build in and downloaded to the DMLS machine allowing the build to begin. The DMLS machine uses a high-powered 200 watt Yb-fiber optic laser. Inside the build chamber area, there is a material dispensing platform and a build platform along with a recoater blade used to move new powder over the build platform. The technology fuses metal powder into a solid part by melting it locally using the focused laser beam. Parts are built up additively layer by layer, typically using layers 5, 10, 15, 20, 25, 30, 35, 40, 45, or 50 microns (micrometers) thick. This process allows for highly complex geometries to be created directly from the 3D CAD data, fully automatically, in hours and without any tooling. DMLS is a net-shape process, producing parts with high accuracy and detail resolution, good surface quality and excellent mechanical properties. Currently available alloys used in the process include 17-4 and 15-5 stainless steel, cobalt chromium, Inconel 625 and 718, and titanium Ti6Al4V. Theoretically, almost any alloy metal can be used in this process once fully developed and validated. In an embodiment the composite material comprising ceramic, glass, mineral or metal particles can be formed into a filament and delivered by Direct Metal Laser Sintering (DMLS).

Plastic Free forming unlike conventional additive manufacturing techniques, with ARBURG Plastic Freeforming (AKF) standard granulates are melted as in the injection molding process. The freeformer produces layer by layer from minuscule droplets. The discharge unit with nozzle remains stationary, while the component carrier moves. The globally unique AKF process makes use of 3D CAD files, which are read in directly by the freeformer. After start-up, everything else takes place automatically. A nozzle closure with piezo-technology builds up the desired component layer by layer from minuscule plastic droplets. During this process, the item under construction is moved by a component carrier with three or five axes. Fully functional parts are created with minuscule plastic droplets, without a mold. Low-cost standard granulates are used instead of expensive special materials. No support structures are necessary as the stationary discharge unit and moving component carrier is capable for complex 3D geometries. AKF is also suitable for processing two components, e.g. in moving hard/soft combinations. Parts are automatically built up layer by layer on the basis of 3D CAD files. In an embodiment the composite material comprising ceramic, glass, mineral or metal particles can be formed into a filament and delivered by Plastic Freeforming.

3D printing manufacturing renders virtual blueprints from computer aided design (CAD) and "slices" them into digital cross-sections for the machine to successively use as a guideline for printing. Depending on the machine used, material or a binding material is deposited on the build bed or platform until material/binder layering is complete and the final 3D model has been "printed." It is a WYSIWYG ("what you see is what you get") process where the virtual model and the physical model are almost identical.

To perform a print, the machine reads the design from a computer file and lays down successive layers of liquid, powder, polymer, paper or sheet material to build the model from a series of cross sections. In the embodiments of this application, the viscoelastic composite materials of the embodiment comprising interfacially coated ceramic, inorganic minerals, metal, or glass bubble particles and spheres are especially useful in 3D printing manufacture. These layers, which correspond to the virtual cross sections from the CAD model, are joined or automatically fused to create the final shape. The primary advantage of this technique is its ability to create almost any shape or geometric feature in three-dimensional space, or xyz-space. 3D printer resolution describes layer thickness and X-Y resolution in dpi (dots per inch), or micrometers. Typical layer thickness is around 16 to 20, 25, 30, 35, 40, 45, 50, 55, 60, 65, 70, 75, 80, 85, 95, or 100 micrometers (μm). Construction of a model with contemporary methods can take anywhere from several hours to several days, depending on the method used and the size and complexity of the model. Additive systems can typically reduce this time to a few hours, although it varies widely depending on the type of machine used and the size and number of models being produced simultaneously.

Such systems are commercially available from Stratasys, Inc. Eden Prairie Minn. After sintering, the object or shape can be worked, heated, polished, painted or otherwise formed into new shapes or structures.

Metal particulates can be formed into specific structural parts using conventional technology. Typical materials include iron, iron alloys, steel, steel alloys, brass, bronze, nickel and nickel based alloys, copper, aluminum, aluminum alloys, titanium, titanium alloys, etc. The metallic particulate can be used to make porous materials such as high temperature filters, metering devices or orifices, manifolds, reservoirs, brake parts, iron powder cores, refractory materials, metal matrix composites, and others.

Manufacture

In the manufacture of useful products with the composites of the embodiment, the manufactured composite can be obtained in appropriate amounts, subjected to heat and pressure, typically using powder metallurgy processes and equipment, such as sintering, and then formed into an appropriate shape having the correct amount of materials in the appropriate physical configuration.

The manufacture of the particulate and polymer composite materials depends on good manufacturing technique. Such techniques are fully described in U.S. Pat. No. 7,491,356 "Extrusion Method Forming An Enhanced Property Metal Polymer Composite" and U.S. patent application publications U.S. 2010/0280164 "Inorganic Composite", U.S. 20100280145 "Ceramic Composite", and U.S. 2010/0279100 "Reduced Density Glass Bubble Polymer Composite" herein incorporated in their entirety. Often the particulate is initially treated with an interfacial modifier by spraying the particulate with a 25 wt.-% solution of the interfacial modifier on the particle with blending and drying carefully to ensure uniform particulate coating of the interfacial modifiers. Interfacial modifiers may also be added to particles in bulk blending operations using high intensity Littleford or Henschel blenders. Alternatively, twin cone mixers can be followed by drying or direct addition to a screw-compounding device. Interfacial modifiers may also be combined with the metal particulate in aprotic solvent such as toluene, tetrahydrofuran, mineral spirits or other such known solvents.

The composite materials having the desired physical properties for MIM and 3D printing can be manufactured as follows. In a Useful mode, the surface coating of the particulate with the interfacial modifier is initially prepared. The interfacial modifier is coated on the prepared particle material, and the resulting product is isolated and then combined with the continuous polymer phase between the particulate and the polymer. In the composite, the coating of the interfacial modifier on the particle is less than 1 micron thick, in some cases atomic (0.5-10 Angstroms) or molecular dimensions (1-500 Angstroms) thick. In one aspect, the function of the interfacial modifier isolates the polymer from the particle as well as from the other particles. The polymer "sees" only the coating material and does not react to the interfacial modifier coating in any substantial way.

Testing via *ASTM D638—10 Standard Test Method for Tensile Properties of Plastics* and *ASTM D1238—10 Standard Test Method for Melt Flow Rates of Thermoplastics by Extrusion Plastometer* may be performed to characterize the composite material. Depending on the nature of the final composite material, suitable and necessary modifications to the test method may be made to produce accurate and industrial significant results. Viscosity measurements for composite materials useful in MIM and 3D Printing are greater than 30, greater than 40, greater than 50, greater than 60, or greater than 60 Pa-s.

Once the composite material is prepared, it is then formed into the green body desired shape of the end use material for MIM or feedstock for 3M printing. Solution processing is an alternative that provides solvent recovery during materials processing. The materials can also be dry-blended without solvent. Blending systems such as ribbon blenders obtained from Drais Systems, high density drive blenders available from Littleford Brothers and Henschel are possible. Further melt blending using Banberry, single screw or twin screw compounders is also useful. When the materials are processed as a plastisol or organosol with solvent, liquid ingredients are generally charged to a processing unit first, followed by polymer, particulate and rapid agitation. Once all materials are added a vacuum can be applied to remove residual air and solvent, and mixing is continued until the product is uniform and high in density.

Dry blending is generally useful due to advantages in cost. However certain embodiments can be compositionally unstable due to differences in particle size. In dry blending processes, the composite can be made by first introducing the polymer, combining the polymer stabilizers, if necessary, at a temperature from about ambient to about 60° C. with the polymer, blending a particulate (modified if necessary) with the stabilized polymer, blending other process aids, interfacial modifier, colorants, indicators or lubricants followed by mixing in hot mix, transfer to storage, packaging or end use manufacture.

Interfacially modified materials can be made with solvent techniques that use an effective amount of solvent to initiate formation of a composite. When interfacially modification or interfacial treatment is substantially complete, the solvent can be stripped. Such solvent processes are conducted as follows:

1) Solvating the interfacial modifier or polymer or both;
2) Mixing the metal particulate into a bulk phase or polymer master batch: and
3) Devolatilizing the composition in the presence of heat vacuum above the Tg of the polymer When compounding with twin screw compounders or extruders, a Useful process can be used involving twin screw compounding as follows.

1. Add metal particulate and raise temperature to remove surface water (barrel 1).
2. Add interfacial modifier to twin screw when the particulate is at temperature (barrel 3).
3. Disperse/distribute/coat interfacial modifier on particulate.
4. Maintain temperature to completion.
5. Vent VOC (barrel 6).
6. Add polymer binder (barrel 7).
7. Compress/melt polymer binder.
8. Disperse/distribute polymer binder in particulate.
9. Blend modified particulate with polymer melt binder.
10. Vacuum degas remaining VOC (barrel 9).
11. Compress resulting composite.
12. Form desired shape, green body, feedstock, pellet, lineal, tube, injection mold article, etc. through a die or post-manufacturing step.
13. Debinding
14. Sinter Alternatively in formulations containing small volumes of continuous phase:

1. Add polymer binder.
2. Add interfacial modifier to twin screw when polymer binder is at temperature.
3. Disperse/distribute interfacial modifier in polymer binder.
4. Add filler and disperse/distribute particulate.
5. Raise material to temperature.
6. Maintain temperature to completion.
7. Compress resulting composite.
8. Form desired shape, green body, feedstock, pellet, lineal, tube, injection mold article, etc. through a die or post-manufacturing step.
9. Debinding forming the brown body or part.
10. Sinter The composite formulation for shaped article of a green body or feedstock, whether formed with interfacially modified ceramic, metal, inorganic, or glass bubble particulate, has attributes of a high volume particle fraction packing, and improved mechanical/physical properties such as viscoelasticity and melt flow. After sintering the shaped article can have increased densification, resistance to oxidation, and minimal shrinkage. The post-sintered shaped article has the physical characteristics of the underlying particulate. Further, the sintering process is much improved due to the characteristics and properties of the viscoelastic composite.

For powder injection molding, metal injection molding or additive manufacturing with the disclosed composite material, the particulate material such as ceramic, inorganic, glass, metal particulate are non-ductile resources but they can be used in shaping processes, if they are mixed with materials such as organic substances. These organic substances are, such as for example polymers, also called "binder".

The use of polymer as a binder varies according to the processing method and the particulate mixture. Binders give the green body a sufficient strength by associating particles at their boundary surfaces. Usually those binders are used as plastification agents. They make possible the flow of the particulate during processes such as extruding, injection molding, and additive manufacturing. The interfacially modified particulate can attain volume or weight packing levels in the composite material that are greater than theoretical, but the composite material does retain its melt flow and rheological characteristics that are useful in extrusion, metal injection molding and additive manufacturing.

In brief, the process for powder injection molding, metal injection molding or additive manufacturing with the disclosed composite material may take many variations, but the key steps are 1) feedstock preparation of the composite material used for the body of a part or object, 2) injection molding or laying down of layers of composite material using additive manufacturing techniques to form a "green body" of the part or object, 3) debinding the part or object, and 4) sintering the part or object. Preparation of the feedstock or the composite material of the embodiment to provide a homogeneous, highly packed coated particulate, injection molding and additive manufacturing processes have been disclosed.

Before sintering green bodies, the debinding process of the polymers to form the brown body, such as, for example, the removal of the polymer material, must be performed. The removal of the binder is via degradation, extraction or evaporation via the surface channels in the "green body". Debinding can be the most time consuming and expensive step in the part or object formation. Debinding the part may be done via thermal, solvent or catalytic methods. Binder material is chosen based on the selection of the debinding method. The composite material of the embodiment, comprising particulate that is coated with interfacial modifier, improves the debinding process by allowing debinding to proceed more quickly and efficiently than particulate that is uncoated. The higher volume or weight fractions of the coated particulate permits the use of less binder in the part or object, and the rheology and melt flow of the composite material provide for the part or object to be more quickly formed. Such higher particulate fractions are not possible with uncoated particulate.

The temperatures for thermal debinding vary between 60° C. and 600° C. Organic polymers have to be removed completely from the green body, since carbon delays and can influence the sinter process. Further the qualities of the final product can be negatively impacted by residual carbon from the polymer. The debinding process typically is a time intensive step in the complete production process. The speed of decomposition of the polymers should not exceed the transport velocity of the products of pyrolysis, since an excess pressure of the gaseous pyrolysis products can lead to rips and to the destruction of the brown body.

During raw material preparation the binder has to give an optimum binding to the green body. A minimum of binder quantity should realize the desired plasticity of the compound and to avoid forming byproducts during debinding that could negatively affect the final part or object. Requisites for an effective binder can be defined as follows: 1) The structure of the binder must allow a preparation of the compound with low abrasion to the equipment be it extrusion, injection molding or additive manufacturing. 2) The binder should be processable without decomposition in a temperature range of 20° C. to 350° C. relative to the rate of the melt processing or additive manufacturing procedure. 3) In order to protect the operating personnel toxic substances should be avoided. 4) The melting point of thermoplastic binders should be as wide ranging as is demanded by the forming machine be it injection molding or additive manufacturing. 5) Stabilization against deterioration of microorganisms is necessary and of oxidation or light ageing in thermoplastic systems. 6) The binder should grant a sufficient stability of the formed product for non-destructive transport or for mechanical finishing.

Binders can be classified into three classes 1) slip additives, 2) binding agents and 3) plasticizers or plastification agents. Slip additives are used to reduce the internal friction of particulates during pressing and to allow a non-destructive and fast release of the mold from the die. Slip additives are added as aqueous solutions in corresponding concentrations or as powder, which will be mixed with the mass. Binding agents are added to increase the flexural strength of the pressed body and plastification agents may increase the plasticity of the mass especially when the forming will be done in piston presses or in screw extrusion presses. The amount of plastification agents varies between 0.2% and 1% and depends on the grain size of the mass, on the dimension of the mold and the pressure of the press.

Organic plastification systems have to be distinguished between 1) aqueous systems, 2) solvent containing systems, and 3) thermoplastic systems. Aqueous plastification systems consist of dispersions or solvents of polymers where the water has the function of deflocculant or solvent. The effectivity of plastification is not only caused by the structure of polymers but also supported by the water content. Solvent containing systems are disappearing in particulate production facilities because of the increasing demands of environment protection, workplace hygiene and safe working conditions. Thermoplastic systems were originally developed for injection molding machines in the plastics industry. Thermoplastic systems are exemplified, for example, by paraffin, wax, polyolefin wax materials; thermoplastic resins such as polyolefin, polypropylene (PP), polyethylene (PE), polyacetal, polyoxymethylene (POM). Molecular chains of polyolefin thermoplastic, polypropylene (PP) and polyethylene (PE) resins are much longer than those of waxes. This difference arises in higher binding forces of thermoplastics and as a consequence a higher melting viscosity and melting point.

The thermal treatment of the debinding process destroys the polymers by oxidation or combustion in an oxygen containing atmosphere. Very often it is an uncontrolled reaction of high reaction rate inside the shaped part creating a high gas pressure, which can lead to ruptures within the part. It is useful to transfer reactive thermoplastics into a modification of radical decomposition, which is easier to oxidize. This is a way to transfer polymers of high viscosity into substances of oily consistency. The radical decomposition will start with a defined temperature and continue as a chain reaction. Also in hydrogen atmospheres a de-waxing process can be accomplished, but of course instead of an oxidation a hydrogenation of decomposition products will occur.

The defining physical procedures of thermal debinding are 1) the capillary flow, 2) the low pressure diffusion process, and 3) the high pressure permeation process. The capillary forces involve liquid extraction, while the other two require the binder to be a vapor. Slightly elevated temperatures influence the viscosity and surface tension of the organic liquid; capillary forces start with the transport of the liquid phase from big to small pores. As soon as binder arrives at the surface it will be vaporized, if its vapor pressure is larger than the ambient pressure. With increasing temperature, the kinetics of volatilisation increases too. Above a certain temperature the capillary forces cannot saturate the demand of volatilisation of the liquid at the surface and the interface of both the vapor and the liquid is pulled back to the inside of the body. The binder may be thermally decomposed into low molecular weight species, such as $H_2O$, $CH_4$, $CO_2$, CO etc. and subsequently removed by diffusion and permeation. The difference between diffusion and permeation depends on the mean free path of the gas species. The mean free path varies with the pressure, molecular weight of the gas and pore dimensions. Generally, diffusion will be dominant at low pressures and small pore sizes; permeation would be expected to control debinding with large pore sizes and high vapor pressures, where laminar flow controls the rate of gas exit from the compact. Typically the pressure of a debinding process varies between $10^{-3}$ bar and 70 bar and the grain sizes between 0.5 and 20 mm.

The thermal decomposition of polymers takes place by radical splitting of their chain. A homolytic decomposition of a C—C-bond leads to radical cracked products. Homolytic means the symmetric decomposition of the duplet. The intermolecular transfer of hydrogen and the continuous decomposition of the polymeric chain create saturated and unsaturated fractions consisting of monomers and oligomers during the debinding process.

"Sintering is the process whereby particles bond together typically below the melting point by atomic transport events. A characteristic feature of sintering is that the rate is very sensitive to temperature. The driving force for sintering is a reduction in the system free energy, manifested by decreased surface curvatures, and an elimination of surface area" (*Powder Metallurgy Science,* 1989, pg. 148). The interfacial modifier on a particle surface may cooperate in the sintering process to the level of fusing with other interfacial modifier coatings on other particles to form the sintered product. The interfacial modified surfaces that fuse or sinter may be the same or different relative to the organo-metallic interfacial modifier. Further, the grain boundary, the interface between particles, may fuse or sinter as well.

The steps in sintering for MIM or 3D Printing may be summarized as follows:
  1) Feedstock or composite compounding.
  2) 3D printing or injection molding of feedstock or composite to form a green body or a preform.

3) Debinding, thermally, chemically or other means, of the green body to form the brown body.
4) Sintering the brown body to form the sintered part.
5) Post sintering finishing.

If required for product specifications, inert, reducing and/or oxidizing atmospheres, applied during the appropriate stage of the sintering process, may provide useful characteristics to the final product. The gases that can be used to provide these atmospheres are argon, nitrogen (inert), hydrogen (reducing), and oxygen, air (oxidizing). If appropriate, the sintering step may occur under vacuum.

Example 1

The metal particles were Carpenters 316L stainless steel (90%<16 μm) and a special cut of Ervin ES-140 stainless steel (+150 to −106 μm). The particles were blended in a 3:1 (bigs:smalls) ratio. The raw particles were added to a lab scale mixer for about 5 minutes to obtain an evenly distributed blend. Isopropyl alcohol was added into the mix. Titanium tri isostearoyl isopropoxide, CAS RN 61417-49-0, was then added at a dosage level of 1.0 pph. The batch was mixed and heated to about 90° C., until all IPA evaporated off the treated powder. Current Batch Formulation: 2100 g ES-140, 700 g 316L, and 28 g Titanium tri isostearoyl isopropoxide. Treated particles were compounded with TPX® DX310 (Poly methyl-pentene, Mitsui Chemicals) at 75% of treated particles.

The maximum loading ratio of treated particles to polymer was calculated based upon pyncnometer density and powder puck density, shown in Equation 1. This value was the theoretical maximum attainable volume fraction of treated particles in the product.

$$\text{Maximum Loading} = \frac{\text{Powder Press Density}}{\text{Pycnometer Density}} \quad (1)$$

A treated volume fraction was chosen based upon the calculated maximum loading; this volume fraction was generally lower than the calculated value. The treated particles were compounded on the 19 mm lab scale compounder with the polymer TPX® DX310 (Poly methyl-pentene, Mitsui Chemicals), a polyolefin polymer.

As an initial test, a powder disk with treated particles was pressed in a mold. A powder puck was formed by pressing the treated powders 30 times to maximum pressure on the lab jacks. The dimensions of the puck were measured in order to provide a comparative analysis between the sample before and after the sintering process.

Two pucks, each about 3.5 mm thick, were then made using material compounded with the TPX® DX310. Densities of each were calculated, and the pucks were placed one on top of the other. Here, the purpose was to sinter the two pieces together and calculate a new density of the sintered piece.

Upon completion of compounding, pellets were extruded on the wire line. The wire line has a 1" extruder and a 0.075" diameter die. The extruder contains 3 zone temperature controls within the barrel, as well as a die temperature control. The back two zone temperatures are kept well below the melting point of the polymer, which acts as a reduction of the barrel length and thus reduces the resonance time of the material at temperature. Extruded material was drawn down to a diameter of about 0.068-0.072" and spooled up. The viscosity of this material was 43.1 Pa*s.

Strips of wire were then stacked upon one another to simulate a 3D printed part for sintering.

The sintering process occurred in a tube furnace. This furnace was purged with Nitrogen/Hydrogen gas in order to prevent any oxidation of the sample. The material is heated under vacuum to 1250° C., at a rate of 300° C. per hour. The furnace was then held at temperature for an hour before being cooled back to room temperature.

In the appropriate product design, during composite manufacture or during product manufacture, a pigment or other dye material can be added to the processing equipment. One advantage of this material is that an inorganic dye or pigment can be co-processed resulting in a material that needs no exterior painting or coating to obtain an attractive, functional, or decorative appearance. The pigments can be uniformly distributed throughout the material and can result in a surface that cannot chip, scar or lose its decorative appearance. One particularly important pigment material comprises titanium dioxide ($TiO_2$). This material is extremely non-toxic, is a bright white particulate that can be easily combined with either metal, glass, non-metal, inorganic or mineral particulates to enhance the novel characteristics of the composite material and to provide a white hue to the ultimate composite material.

We have further found that a blend of two, three or more metal, glass, non-metal, inorganic or minerals in particulate form can obtain important composite properties from all of metal, glass, non-metal, inorganic or minerals in a composite structure. Such composites each can have unique or special properties. These composite processes and materials have the unique capacity and property that the material acts as a blended composite of two or three different glass, metal, non-metal, inorganic or minerals that could not, due to melting point and other processing difficulties, be made into a blend without the methods of the embodiment.

Example 2

Zirconium Silicate

We obtained the zirconium silicate (ZS) spheres in the 70-125 micron size range (product name ZS B0.07) from Stanford Materials (CA). The uncoated helium pyncnometer density of the zirconium silicate was determined to be 3.78 g/cc. Packing density using the metallurgical press was determined to be 2.42 g/cc yielding a packing fraction of 64.1% for the unmodified and 2.53 g/cc and 69.2% for particulates modified with 2 phr NZ-12 (the pyncnometer result for the modified zirconium silicate was 3.657 g/cc). The results indicate that the interfacial modifier increases the ability to increase packing of the zirconium silicate spheres.

Unmodified ZS-B0.07 was compounded with THV 220A using the 19 mm B&P laboratory compounder at a target loading of 60 volume %. The compounder was equipped with a 3 hole die and was using the 4 blade pellet cutter at 100 RPM. At a set compounder screw speed of 185 RPM with a flat 185° C. temperature profile, the compounder exhibited torque of 30-35% of max, pressure of 80-110 psi and a melt temperature of 200° C. A puck of the compounded pellets had a density of 3.03 g/cc which was within 2% of the target density.

Interfacially modified ZS was also compounded with THV 220A also at a target loading of 60 volume % zirconium silicate. To maintain a 60.1 vol % particles (treating the ZS as the particle and the coating layer and the THV as the continuous matrix phase in the composite) a mass ratio of 23.2 wt % THV and 76.8 wt % coated ZS was used. A metallurgical press of the compounded pellets produced a puck with a density of 2.965 g/cc which was within 2% of the target density.

Both materials were extruded at temperature profile of 154, 150, 150, 140° C. from throat to die but motor load was not recorded for either run due to attention on feed and extrudate using a 19 mm 3 mm rectangular shaped die plate. The finish was good for both materials, no noticeable difference, but the flexibility of the materials was obvious when a section was bent. The modified material was flexible whereas the unmodified material was brittle.

Tensile samples were cut then pulled at one inch per minute using the tensile tester. Figure 3 shows the average tensile response of the coated and uncoated materials compared to pure THV 220A. Stress/strain curves were determined using type-IV dogbones with brittle (uncoated) and elastic (when coated at 2 phr of NZ-12) behavior observed.

Because the physical properties (tensile stress/stain curves) and processing within compounding and extrusion were favorable when loading THV220 to about 60 volume % zirconium silicate, we proceeded with a process study to confirm the metallurgical press results that reveal the ability to pack the coated zirconium silicate to a higher level than the uncoated material.

2$^{nd}$ Experiment: Determining Maximum Packing Level with the 19 mm Compounder:

Throughout the experiments, the volumetric throughput was kept constant at 60 cc/min with an isothermal temperature profile of 185° C. and a screw speed of 185 RPM and a three hole pellet die plate. Tables 4 and 5 show data for composites with unmodified and modified particle.

TABLE 4

Uncoated

| Vol. % Z. Silicate | Torque (%) | Pressure (psi) | Melt T (° C.) |
|---|---|---|---|
| 0 (all THV) | 25 | 0 | 195 |
| 60 | 40-45 | 210 | 204 |
| 64 | 50 | 430 | 208 |
| 68 | 65 | 750-810 | 224 |
| 70 | 65 | 900 | 235 |
| 72 | Overload | — | — |
| 70 (replicate)* | 75-80 | 1070 | 242 |
| 71* | 95 | 1270 | 250 |

*Note, gathered strands and determined puck density of 3.05 g/cc vs a 3.26 composite density that would correlate to 70%. This value indicates that the composite is starved of polymer resulting in voids within the composite.

TABLE 5

Coated with 2% NZ-12

| Vol. % Zr Silicate | Torque (%) | Pressure (psi) | Melt T (° C.) |
|---|---|---|---|
| 70 | 40 | 400 +− 50 | 211 |
| 72 | 60 | 400 +− 50 | 230 |
| 74 | 60 | 300 | 229 |
| 77 | 50 | 220 | 222 |

Note the reduced torque and pressures associated with the modified material run at a given volumetric level (e.g. 70 volume %). Processing at a higher packing indicated a lower particle: particle friction level in the modified particles; a puck density of the combined levels (70-77 volume %) was 2.96 g/cc. The results indicate that the composite samples were polymer starved at particulate levels beyond the packing fraction (a trend that explains the lower torque and pressures as zirconium silicate levels increased).

This inorganic or ceramic composite material is formed into a filament by extrusion processes and the filament is used in FDM® to provide a part or object.

In summary, the composites, as dictated by the specific claims contained herein, represents a breadth of raw material combinations including; metals, inorganic particles, ceramic particles, glass bubble particles, polymers, interfacial modifiers, other additives, all with varying particle sizes, weight fractions, and volume fractions. The present embodiment also includes a breadth of processing methods, such as sintering and densification, resulting physical and chemical properties, and end-use applications. The following materials exemplify the embodiments of the disclosure. The composite materials can all be formed into a filament, printed via additive manufacturing techniques, molded, extruded, and sintered to make into useful composites, shapes, and articles.

I claim:

1. An article adapted for use in an additive manufacturing system, the system comprising a digitally controlled applicator that can deposit a filament in a controlled x-y plane and in a z-direction filament application to obtain a pre-form object; the article comprising a filament, having a diameter of about 0.1 to 3 millimeters, comprising a thermoplastic composite comprising:
   (a) about 70 to 1 wt. % of a thermoplastic polymer; and
   (b) about 99 to 30 wt. % of a metal particulate, dispersed in the polymer, particulate having a particle size of less than 500 microns, and the particulate having exterior coating of interfacial modifier in an amount of about 0.005 to 10.0 wt. %, all percentages based on the weight of the filament.

2. The article of claim 1 wherein the metal particulate comprises a blend of a first particulate and a second particulate.

3. The article of claim 2 wherein the first particulate has a particle size less than 100μ and the second particulate has a particle size greater than 100μ.

4. The article of claim 1 wherein the filament comprises a ferrous metal particulate dispersed in a polyolefin.

5. The article of claim 4 wherein the filament comprises a stainless steel particulate dispersed in a high-density polyethylene.

6. The article of claim 1 wherein the filament comprises a generally circular cross-section with a diameter of about 0.1 to 2 millimeters.

7. The article of claim 1 wherein the interfacial modifier comprises an organometallic compound selected from the group of organo-titanium compound, organo-zirconium compound or mixtures thereof.

8. An article adapted for use in an additive manufacturing system, the system comprising a digitally controlled applicator that can deposit a filament in a controlled x-y plane with subsequent z-direction filament application to obtain a pre-form object; the article comprising filament having a diameter of about 0.11 to 3 millimeters, the filament comprising a thermoplastic composition comprising:
   (a) about 70 to 1 wt. % of a thermoplastic polymer; and
   (b) about 99 to 30 wt. % of a particulate selected from a ceramic particulate, an inorganic particulate or a glass particulate dispersed in the polymer, particulate having a particle size of less than 500 microns; and the particulate having an exterior coating of interfacial modifier in an amount of about 0.005 to 10.0 wt. %, all percentages based on the weight of the filament.

9. The article of claim 8 wherein the particulate comprises a blend of a first particulate and a second particulate.

10. The article of claim 9 wherein the first particulate has a particle size less than 100μ and the second particle particulate has a particle size greater than 100μ.

11. The article of claim 8 wherein the thermoplastic polymer comprises a polyolefin.

12. The article of claim 11 wherein the filament comprises a high-density polyethylene and the particulate comprises a magnetic particulate, a glass sphere particulate, a glass micro-bubble particulate or mixtures thereof.

13. The article of claim 8 wherein the filament comprises a generally circular cross-section with a diameter of about 0.1 to 2 millimeters.

14. The article of claim 8 wherein the interfacial modifier comprises an organometallic compound selected from the group of organo-titanium compound, organo-zirconium compound or mixtures thereof.

15. An article adapted for use in an additive manufacturing system, the system comprising a digitally controlled applicator that can deposit a filament in a controlled x-y plane and in a z-direction filament application to obtain a pre-form object; the article comprising a filament, having a diameter of about 0.1 to 3 millimeters, comprising a thermoplastic composite comprising:
   (a) about 70 to 1 wt. % of a thermoplastic polymer; and
   (b) about 99 to 50 wt. % of a metal particulate comprising copper, iron or titanium, dispersed in the polymer, particulate having a particle size of 4 to 200 microns, and the particulate having exterior coating of interfacial modifier in an amount of about 0.005 to 10.0 wt. %, all percentages based on the weight of the filament; wherein in the filament the composite has a volume packing greater than 75%.

16. The article of claim 15 wherein the particulate comprises steel.

17. The article of claim 16 wherein the particulate comprises stainless steel.

18. The article of claim 15 wherein the particulate comprises a titanium alloy.

19. The article of claim 15 wherein the particulate comprises a bronze.

20. The article of claim 15 wherein the volume packing is greater than 80%.

21. The article of claim 15 wherein the volume packing is greater than 85%.

22. The article of claim 15 wherein the composite comprises about 99 to 60 wt. % metal particulate.

23. The article of claim 15 wherein the metal particulate comprises a blend of a first particulate and a second particulate.

* * * * *